(12) United States Patent (10) Patent No.: US 7,867,396 B2
Hill (45) Date of Patent: Jan. 11, 2011

(54) WATER TREATMENT APPARATUS, METHOD AND SYSTEM

(75) Inventor: Peter Worthington Hill, Beerwah (AU)

(73) Assignee: Black & Grey Holdings Pty Ltd, North Sydney, New South Wales (AU)

( * ) Notice: Subject to any disclaimer, the term of this patent is extended or adjusted under 35 U.S.C. 154(b) by 412 days.

(21) Appl. No.: 11/632,002

(22) PCT Filed: Jul. 11, 2005

(86) PCT No.: PCT/AU2005/001008

§ 371 (c)(1),
(2), (4) Date: Jan. 9, 2007

(87) PCT Pub. No.: WO2006/005118

PCT Pub. Date: Jan. 19, 2006

(65) Prior Publication Data

US 2008/0017566 A1 Jan. 24, 2008

(30) Foreign Application Priority Data

Jul. 9, 2004 (AU) ............................... 2004903776

(51) Int. Cl.
*C02F 3/32* (2006.01)
*C02F 3/04* (2006.01)
(52) U.S. Cl. ...................... 210/602; 210/617; 210/150
(58) Field of Classification Search ................ 210/602, 210/615–617, 150, 151, 284; 119/6.7
See application file for complete search history.

(56) References Cited

U.S. PATENT DOCUMENTS

| | | | | | |
|---|---|---|---|---|---|
| 3,961,603 | A | * | 6/1976 | Gaddie, Sr. | ................... 119/6.7 |
| 4,427,548 | A | * | 1/1984 | Quick, Jr. | ................... 210/617 |
| 4,851,112 | A | * | 7/1989 | Schlensker | ................. 210/123 |
| 5,618,428 | A | * | 4/1997 | Oslund | ........................ 210/602 |
| 5,919,366 | A | * | 7/1999 | Cameron | .................... 210/602 |
| 5,958,239 | A | * | 9/1999 | Sing | ........................... 210/605 |
| 6,223,687 | B1 | | 5/2001 | Windle | |
| 6,474,259 | B1 | * | 11/2002 | Gaugler | ...................... 119/6.7 |
| 2002/0008065 | A1 | * | 1/2002 | Elston | ........................ 210/605 |

FOREIGN PATENT DOCUMENTS

| | | |
|---|---|---|
| EP | 0 192 631 B1 | 8/1986 |
| EP | 0 196 887 A2 | 10/1986 |
| EP | 0 454 595 A1 | 10/1991 |
| EP | 0 999 194 A2 | 5/2000 |

(Continued)

OTHER PUBLICATIONS

"Worms Can Recycle Your Garbage" (http://www.nyworms.com/vermicomposting.htm).

*Primary Examiner*—Fred Prince
(74) *Attorney, Agent, or Firm*—Seyfarth Shaw LLP

(57) ABSTRACT

A modular water treatment apparatus is disclosed having a plurality of cells each respectively arranged in use for housing a treatment bed and a plurality of spacers located between respective adjacent cells. In use the spacers are for providing an air gap between the cells. The cells and spacers are stackable to provide a multiple stage treatment apparatus in which water to be treated percolates through the respective treatment beds located in the cells.

23 Claims, 14 Drawing Sheets

FOREIGN PATENT DOCUMENTS

| | | |
|---|---|---|
| EP | 0 853 878 B1 | 9/2001 |
| ES | 2035763 | 4/1993 |
| JP | 07108290 A | 4/1995 |
| RU | 2033974 C1 | 4/1995 |
| RU | 2049082 | 11/1995 |

* cited by examiner

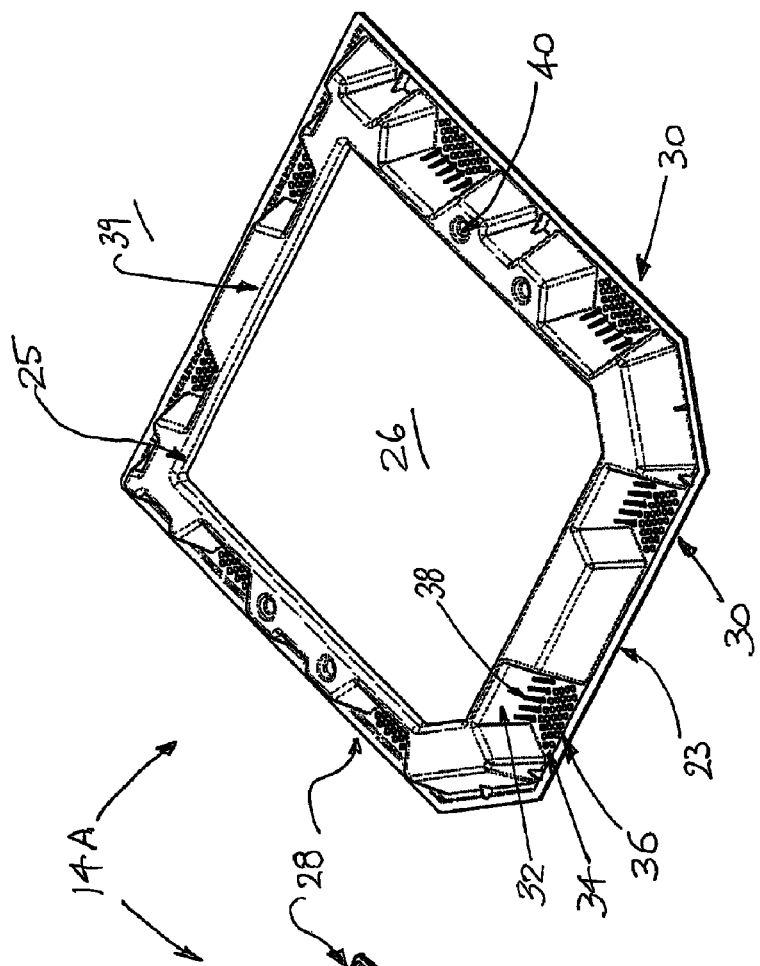
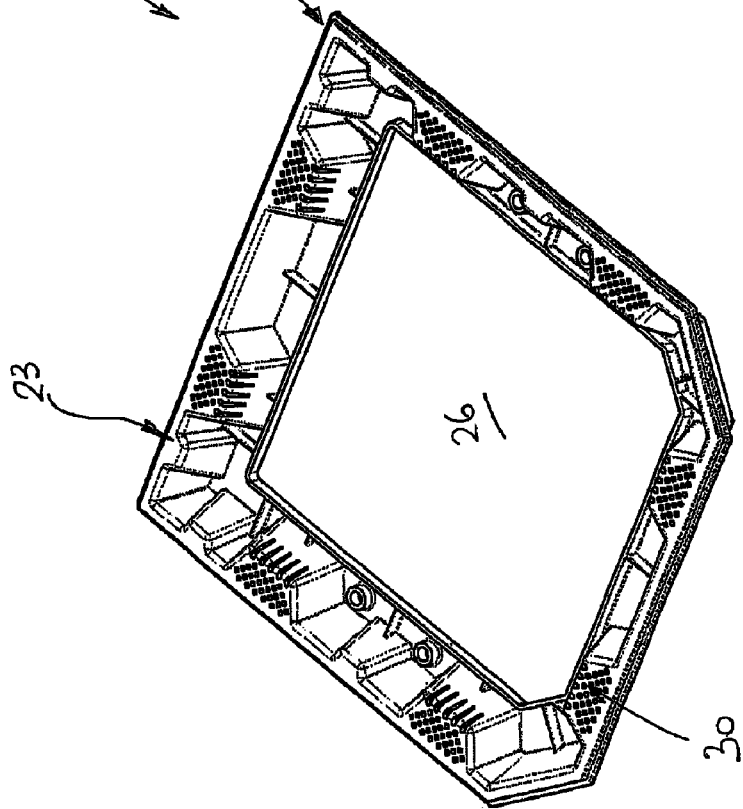
FIG. 5
FIG. 4

P 1-1 : first layer of the primary filter
P 1-2 : second layer of the primary filter
S 1-2 : second layer, secondary filter
S 1-3 : third layer, secondary filter

| Description:<br>(all measurements in mg/L) | P1-1 | P1-2 | S 1-2 | S 1-3 |
|---|---|---|---|---|
| BOD | . | . | 51 | 4 |
| COD | 2300 | 760 | 36 | 27 |
| Dissolved COD | . | . | . | 27 |
| Ammonia (as N) N | . | 0.84 | 0.24 | 0.04 |
| Nitrite (as N) N | . | <0.01 | 0.14 | 0.04 |
| Nitrate (as N) N | . | 0.05 | 2.7 | 3.6 |
| T. Oxid Nit (as N) N | . | 0.05 | 2.8 | 3.6 |
| T. Kjel. N (calc) N | . | 8.2 | 2.3 | 1.4 |
| Total Nitrogen | . | 8.3 | 5.1 | 5 |
| Orth. Phosp. (as P) P | . | 3 | . | 0.3 |
| Tot. Phosp. (as P) P | . | 4.1 | . | 0.41 |

# WATER TREATMENT APPARATUS, METHOD AND SYSTEM

This application is a U.S. National Phase of International Patent Application Ser. No. PCT/AU2005/001008, filed Jul. 11, 2005 which claims priority to Australian Patent Application No. 2004903776 filed Jul. 9, 2004.

FIELD OF THE INVENTION

The present invention relates to water treatment apparatus as well as a method for operating the water treatment apparatus. Such apparatus can be used in a system for treating domestic water but can also be used in all manner of commercial and industrial situations where water treatment is used.

SUMMARY OF THE INVENTION

In a first aspect the present invention provides a modular water treatment apparatus comprising:
  a plurality of chambers each respectively arranged in use for housing a treatment bed; and
  a plurality of spacer elements located between respective adjacent chambers in use for providing an air gap between the treatment beds;
  wherein the chambers and spacer elements are stackable to provide a multiple stage treatment apparatus in which water to be treated percolates through the respective treatment beds.

The inlet water for this treatment apparatus has small amounts of suspended solids and dissolved organic materials present therein. The modular water treatment apparatus is arranged to have a flexible structure so that more capacity can be added to the treatment apparatus by adding more chambers and spacer elements. The modular nature of the system also facilitates ease of maintenance.

In one embodiment, the treatment apparatus may be arranged to filter inlet water without vermicomposting. Alternatively or additionally, in another embodiment the treatment beds can be arranged to host a vermicomposting treatment process. As well as worms of all varieties, the vermicomposting treatment process may utilise other organisms such as beetles, mites, spiders, maggots, fly larvae, bacteria, fungi, nematodes and protozoa to consume contaminants in the water.

In one embodiment the spacer elements can comprise one or more ventilation openings for in use aeration of the filter material layers when the spacer elements and chambers are arranged in a stack.

The ventilation of the organic material layer enhances the vermicomposting process by allowing a sufficient intake of oxygen for the process whilst also facilitating exhaust of gases from organisms present therein such as $CO_2$.

In one form of this embodiment, the or each spacer element may have a central aperture, the aperture defined by a peripheral wall, the wall having the one or more ventilation openings therein. In a further form of this embodiment, the or each ventilation opening can be a slot and/or a hole arranged with an axis aligned in the same direction as the central aperture.

In one embodiment, the spacer element(s) and the chamber (s) can be arranged to be interlocked in use by a system of interfitting projections and recesses.

In an alternative arrangement, each respective chamber can have a said spacer element integrally formed therewith. Such integral chamber and spacer element units can however still be interlocked to other like chamber and spacer element units in use by a system of interfitting projections and recesses.

In one embodiment, the base of the or each chamber can be fitted with a removable mesh screen to support the treatment bed in the or each chamber in use.

In a second aspect the present invention provides a module for use in the modular water treatment apparatus as defined in the first aspect, the module comprising a chamber and a spacer element and arranged to be stackable with a like module as part of the multiple stage treatment apparatus.

In a third aspect the present invention provides a spacer element for use in the modular water treatment apparatus as defined in the first aspect, the or each spacer element having a central aperture, the aperture defined by a peripheral wall, the wall having the one or more ventilation openings therein.

In a fourth aspect the present invention provides a method of water treatment comprising the steps of:
  arranging a treatment bed within each of a plurality of stackable chambers;
  arranging the stackable chambers and respective spacer elements into a stack to provide a multiple stage treatment apparatus, the spacer elements located between respective adjacent chambers to provide an air gap between the treatment beds; and
  passing water which contains biodegradable solids into the stack and allowing the water to percolate through the various treatment beds in the stack.

In one embodiment, the treatment beds can each be arranged to host a vermicomposting treatment process.

In one embodiment, the method can further comprise the step of positioning a mesh screen at a base region of the or each chamber on which the treatment bed is disposed.

In one embodiment of the method, the step of arranging the treatment bed can involves selecting a particulate organic material for use in the treatment bed.

In an alternative embodiment, the step of arranging the treatment bed can involve selecting a particulate organic material and an inorganic material, the inorganic material to be spaced discretely amongst the particulate organic material.

In one form of this alterative method, the inorganic material selected can be a fibrous or porous fabric material. In one form, the fabric material may be shaped as a wad, tuft or pillow. In one form of this, the inorganic material can be made of nylon fibre or matte.

The presence of the fibrous or porous inorganic material can create an alternative host environment into which worms and other creatures and organisms can migrate for a period of time, for example if a sudden influx of a material enters the stack which the creatures are unused to. Such a diversity of habitat can encourage the development of these organisms and help them cope with any environmental fluctuations in the feed wastewater. The presence of the inorganic material can also facilitates a bed with an open, porous structure, which can assist drainage and avoid ponding, or oversaturation, of water therein.

In one embodiment, the organic material can be one of the group comprising peat, coco-peat, vermiculite, zeolite, rice husks, compost base, silica, diatomaceous earth, activated carbon, charcoal, clays or a combination of any of these. The organic material may include other organic support materials such as humus.

In one embodiment of the method, the step of arranging the treatment bed also comprises positioning a filter fabric made of an inorganic substance between the mesh screen and the particulate organic material.

In one embodiment of the method, the step of arranging the treatment bed can also comprise positioning an uppermost mesh screen at a region of the or each chamber which is above the particulate organic material. In one form of this embodiment of the method, the step of arranging the treatment bed can also comprise positioning a filter fabric made of an inorganic substance between the uppermost mesh screen and the particulate organic material.

The mesh screen may diffuse the flow of inlet water so that the water percolates evenly through the organic material which facilitates the vermicompost treatment process and reduces the risk of erosion or disturbance of the organic layer. In addition, the filter fabric can provide an open structure that enables migration of sensitive organisms out of the organic material during times at which the apparatus is subjected to high hydraulic loading pressure, or when an unfamiliar substance is introduced into the organic material via the influent water flow.

The combination of the mesh screen and the filter fabric can diffuse the inlet flow of water into droplet form, which can also increase the uptake of oxygen by the trickling water.

In any of these embodiments, the filter fabric can be arranged to be in contact with the particulate organic material. In any of these embodiments, the inorganic substance of the filter fabric can be nylon. For example the coarser mesh screen material can be a wiry nylon and the relatively finer filter fabric can be a fine nylon matte.

One embodiment of the method also includes the step of delivering water to be treated from a reservoir into the stack. In this embodiment, the step of delivering the water can involve regulating the delivery of a predetermined quantity of water to the stack over a specified time, in other words at a constant mass flux per unit area. In one arrangement of this, the step of delivering the water to the stack can be intermittent, or in other words, delivered in a pulsed arrangement followed by a 'rest' period when no water is supplied to the treatment stack.

One embodiment of the method also including the step of collecting the water after the water has percolated through the various filter material layers in the stack. In one form of this method, the step of collecting the water involves receipt of water into a collection reservoir by gravity.

In some embodiments, the step of collecting water, whether by gravity or not can also be coupled with the further step of treating the water as it is collected by applying an ultraviolet light thereto, to further purify the treated water prior to its re-use.

In a fifth aspect the present invention provides a method of water treatment comprising the steps of:
    arranging a treatment bed in a chamber, the treatment bed comprising a particulate organic material and an inorganic material, the inorganic material arranged so as to be spaced discretely amongst the particulate organic material; and
    passing water which contains biodegradable solids into the chamber and allowing the water to percolate through the treatment bed;
wherein the treatment bed is arranged to host a vermicomposting treatment process.

One embodiment of this method of water treatment can also comprise any of the method steps as defined in the fourth aspect.

In a sixth aspect the present invention provides a treatment bed for a water treatment apparatus, the treatment bed comprising a particulate organic material and an inorganic material, the inorganic material arranged so as to be spaced discretely amongst the particulate organic material.

In a seventh aspect the present invention provides a method of water treatment comprising the steps of:
    arranging a treatment bed to be supported in a chamber; and
    regulating the delivery of a predetermined quantity of water which contains biodegradable solids to the chamber over a specified time, and allowing the water to percolate through the treatment bed;
wherein the treatment bed is arranged to host a vermicomposting treatment process.

In one embodiment, the regulation of the delivery of a predetermined quantity of water to the stack over a specified time can be at a constant mass flux per unit area. In another arrangement of this method, the step of delivering the water to the stack can be intermittent, in other words, delivered in a pulsed arrangement followed by a 'rest' period when no water is supplied to the treatment stack.

One embodiment of this method of water treatment can also comprise any of the method steps as defined in the fourth aspect.

In an eighth aspect, the present invention provides a water treatment system comprising:
    a reservoir for receiving water which contains biodegradable solids;
    a treatment apparatus;
    means for regulating the delivery of the water into the treatment apparatus; and
    a collection reservoir for receiving water that has at least in part been filtered and has had its solids biodegraded.

In one embodiment, the treatment apparatus can be in accordance with the apparatus as defined in the first aspect.

In one embodiment, the means for regulation of the delivery of water can deliver a predetermined quantity of water to the stack over a specified time can be at a constant mass flux per unit area. In another arrangement of this system, the means for regulation of the delivery of water to the stack can be operated intermittently, in other words, delivered in a pulsed arrangement followed by a 'rest' period when no water is supplied to the treatment stack.

In one form, the means for regulating the delivery of water can comprise one of a controllable pump or valve.

In one embodiment, the water treatment system of the eighth aspect can additionally comprise a reticulation system wherein in use the water is drawn from the collection reservoir into the reticulation system for distribution to one or more users.

In another embodiment, the water treatment system of the eighth aspect can further comprise a plurality of treatment apparatus, with each associated with a respective dwelling.

In another embodiment, the water treatment system of the eighth aspect can further comprise a treatment apparatus which is associated with a dwelling and wherein the reservoir for receiving water and the collection reservoir is also associated with the dwelling.

In an alternative embodiment, the water treatment system of the eighth aspect can comprise a treatment apparatus and the reservoir for receiving water associated with a dwelling and wherein the collection reservoir is common to a plurality of dwellings, for example in a street, or hamlet, or even a sub-division of houses.

In one embodiment, the water treatment system of the eighth aspect can comprise the modular water treatment apparatus as defined in the first aspect.

BRIEF DESCRIPTION OF THE DRAWINGS

The invention will be more fully understood from the following description of specific embodiments of the invention. The description is provided with reference to the accompanying drawings. It is to be appreciated that the particularity of the drawings and the related description does not supersede the preceding broad description of the invention.

In the drawings:

FIG. 4 is an underside perspective view of a spacer element of the module of FIG. 2;

FIG. 5 is an upper side perspective view of a spacer element of the module of FIG. 2;

DETAILED DESCRIPTION OF SPECIFIC EMBODIMENTS

In the following description of a water treatment system, the term "grey water" refers to the water stream that comes from the washing and kitchen areas in a domestic home. This waste stream contains wash water from baths, showers and hand basins, as well as wash water from clothes washing and all of the kitchen wash water. Such a stream can contain used wash water that has an organic fraction that comes from body and clothes washing (which can include urine and small amounts of faecal matter). Grey water can also include kitchen waste that is washed into the drain system. This can range from food scraps to oils and fats. The quantities of organic food waste will vary greatly depending on the presence of any organic scrap macerating mechanisms attached to the drainage system. The grey water can also include chemicals that are used in the process of cleaning and washing in the home as well as amounts of lint and other fibres that come from clothing and materials that are washed.

Grey water is distinguished from "black water" which is defined as a waste water stream that is flushed down a toilet and is comprising of faecal matter, urine and toilet paper with a variety of other waste materials. This waste stream contains most of the nutrients and infectious organisms found in waste water and it is primarily because of this content, that black water is problematic to re-use in the environment without effective and expensive treatment.

The water treatment apparatus which will now be described in a number of embodiments is a multi-tiered apparatus which enables a single pass from a domestic wastewater source to trickle through each tier and provide the correct environment for the natural micro-biological living matter to consume the organic foods from the water. A clean, highly oxygenated "reuse water" then leaves the treatment apparatus to be available as a product.

Figure 1:
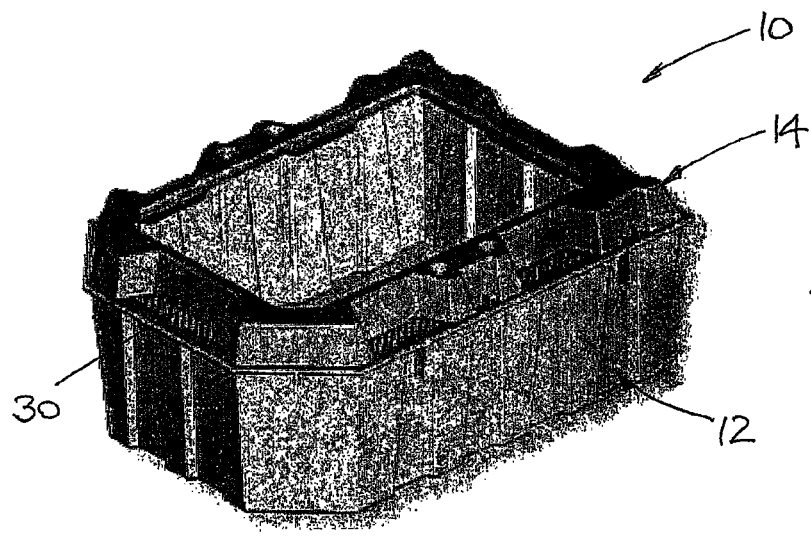
FIG. 1 is a perspective view of one module for use in the modular water treatment apparatus according to an embodiment of the invention.
Figure 2:
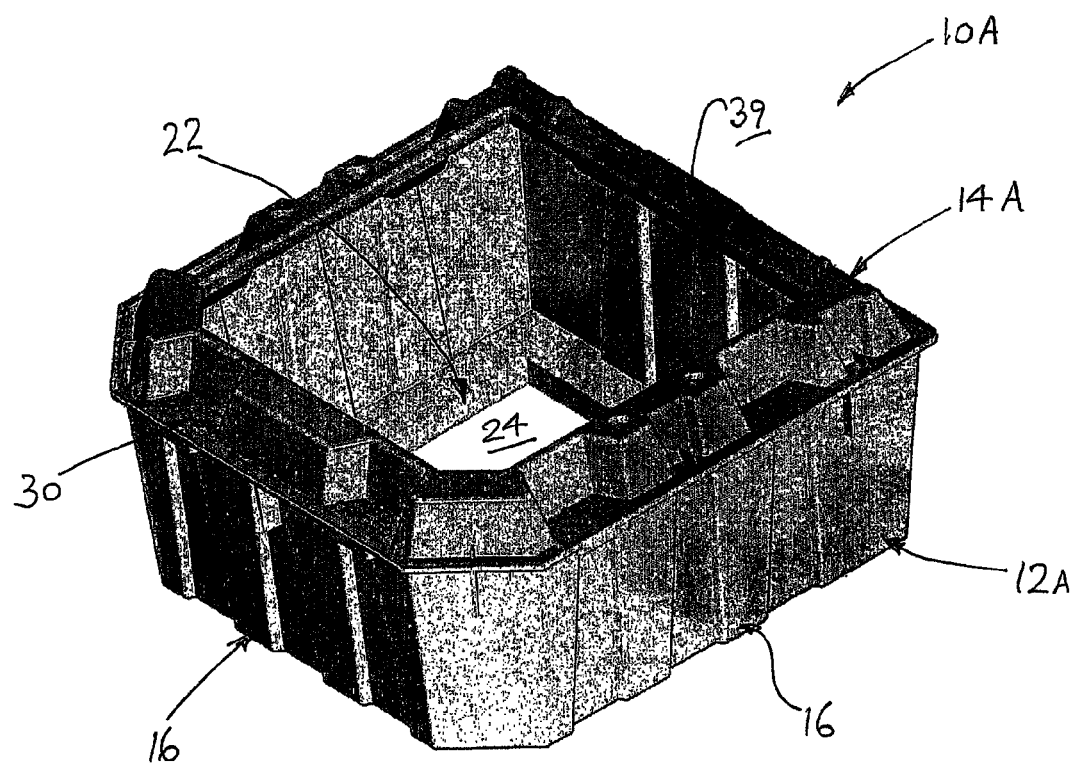
FIG. 2 is a perspective view of another module for use in the modular water treatment apparatus according to an embodiment of the invention.

Referring to FIGS. 1 and 2, a single stage module in the form of a cell unit 10 is shown which can be stacked into the multi-tier arrangement that will shortly be described. Each cell 10 can be made of two components. The first component is a chamber in the form of a cell body 12 for containing filter components and vermicomposting components in various configurations that will shortly be described. The second component is a spacer element in the form of a spacer section 14 which is placed on top of an associated cell body 12 and functions to support the cell body 12 immediately above, as well as for providing a means of introducing air into the multi-tiered apparatus when in use.

In FIG. 2, a further embodiment of the cell 10A having a cell body 12A and spacer section 14A is shown, the dimensions of the cell 10A being generally more square in shape than the rectangular cell 10 shown in FIG. 1. Apart from dimensions, the cells 10 and 10A are used and will perform in all respects in a similar manner.

Figure 6:
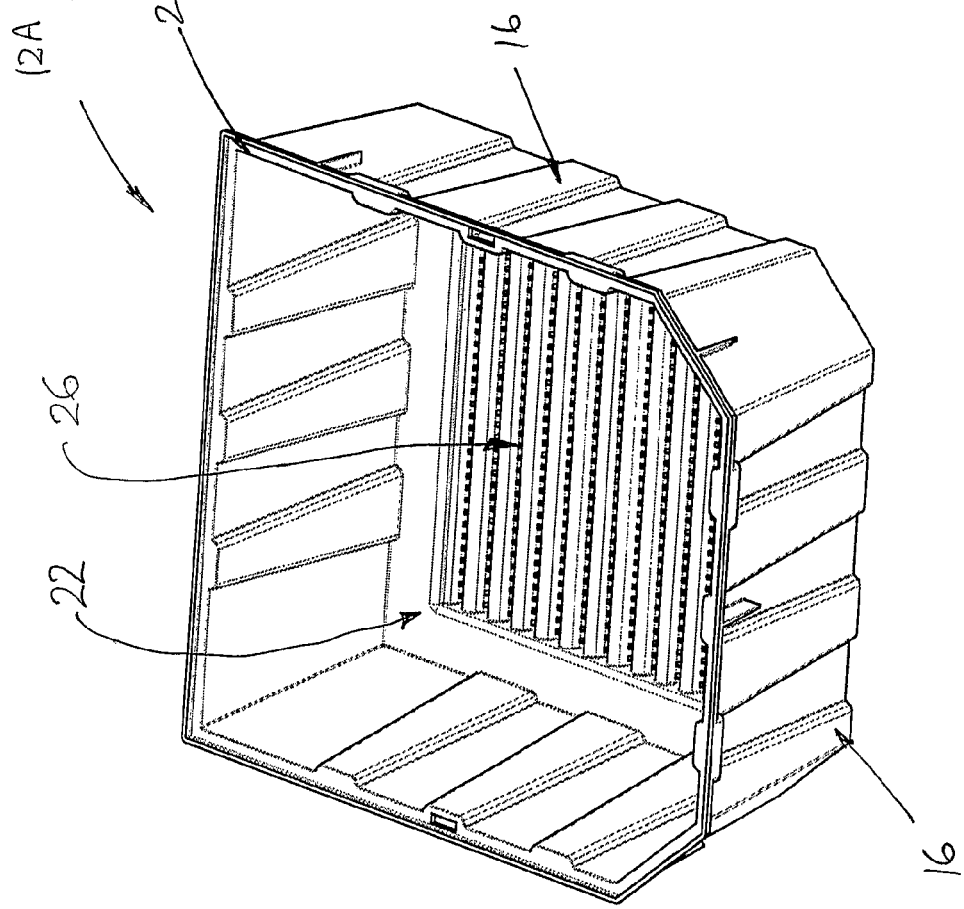
FIG. 6 is a perspective view of a chamber of the module of FIG. 2.

In the particular form shown in FIG. 2, and also in more detail in FIG. 6, the cell body 12A is a hollow four-sided (rectangular or square) cylinder in shape, typically manufactured of an extruded plastic material. Each of the four walls of the cell body 12A is corrugated with various vertically oriented side wall ribs 16 to provide structural strength under load. The uppermost rim 20 of the cell body 12A is configured to interlock with and to support the spacer section 14A. The lowermost edge region of the each of walls of the cell body has a lateral lip 22 which projects inwardly into the space defined by the cell body 12A, as is shown most clearly in FIG. 2. In use this lateral lip 22 functions to support and retain the various layers of material which are located in the cell body 12A during use, whilst still allowing the gravitational flow of water through to the next most immediate cell body and spacer section via the square (or rectangular) opening 24 defined by the lateral lip 22. In FIG. 6 the lateral lip is shown fitted with a mesh screen 26 which is retained thereat to support the contents of the cell body 12A during use.

The particular form of the spacer section 14A in FIG. 2 is shown in more detail in FIGS. 4 and 5. The spacer section 14A has a central aperture 26 (typically square or rectangular in shape) defined by a peripheral wall in the form of a square annulus 28. In use the spacer section 14A is seated and interlocked with the uppermost rim 20 of a cell body 12A positioned immediately therebelow. Like the cell body 12A, the spacer section 14A is also typically manufactured of an extruded plastic material. The general form of each of the four sides of the spacer section is arranged to be angled inwardly so that the rim 25 at the uppermost edge of the square (or rectangular) aperture 26 is configured to be of a matching size to the square (or rectangular) opening 24 defined by the lateral lip 22 at the base of the next most immediate cell body 12A located thereabove, whilst the lowermost edge 23 of the spacer section 14A is arranged to be of the same size as, and interlocked in use with, the uppermost rim 20 of the cell body 12A located immediately therebelow.

Figure 3:
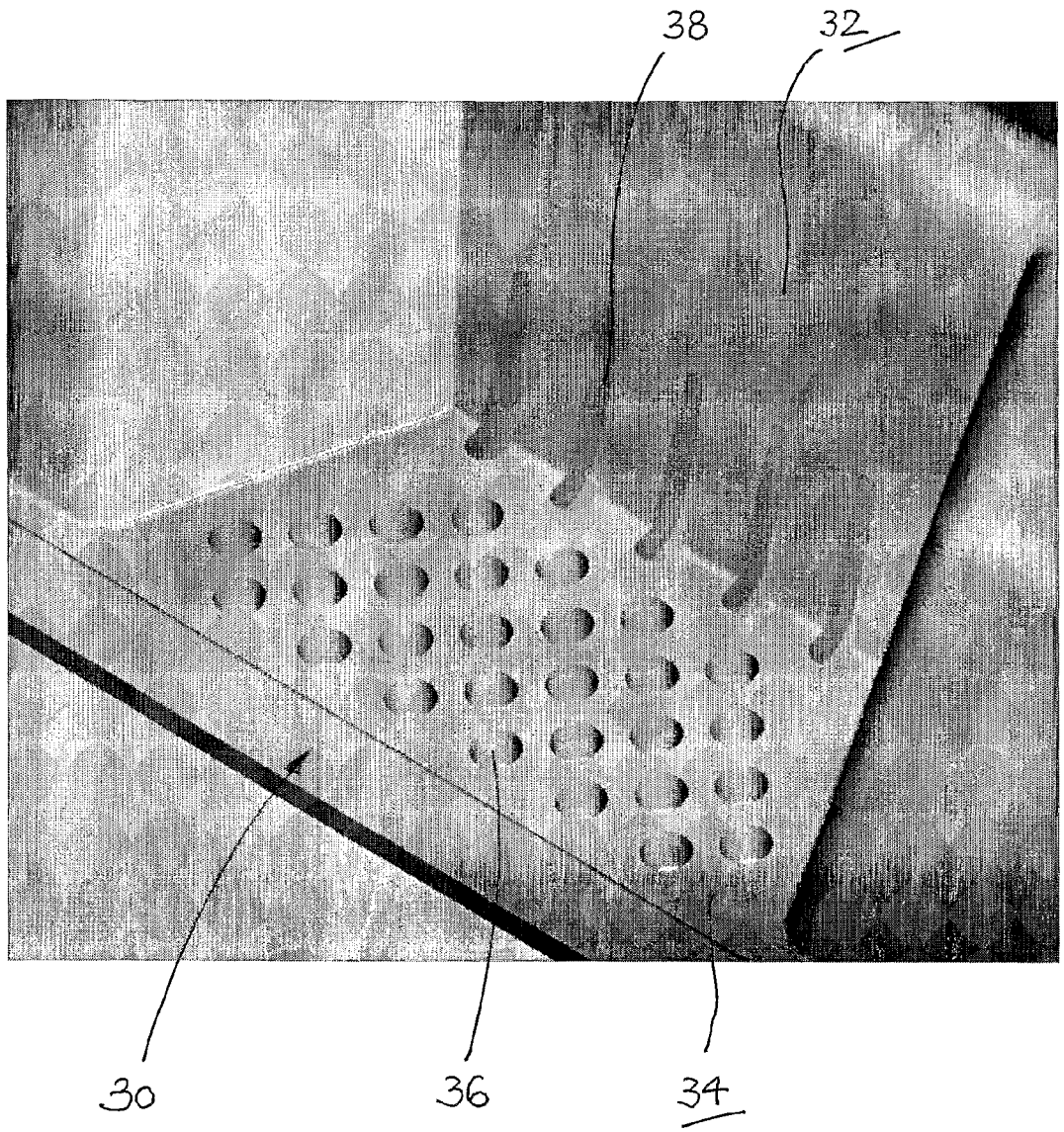
FIG. 3 is a detailed perspective view of a portion of a spacer element of the module of FIG. 2.
Figure 7:
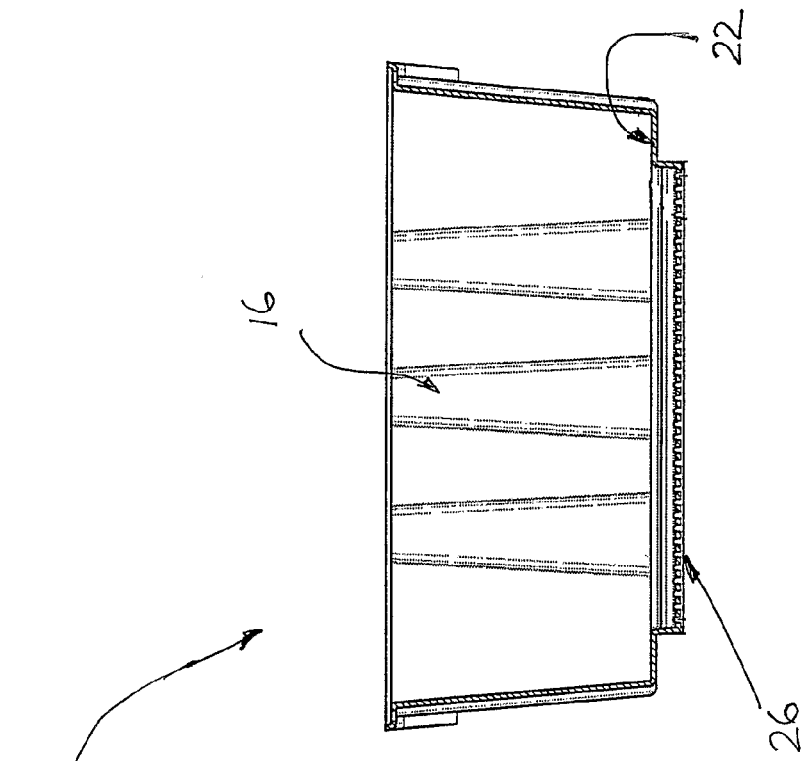
FIG. 7 is a side elevation view of the chamber of FIG. 6.

Because of the generally inwardly angled shape of the four sides (square annulus 28) of the spacer section 14A, a number of cut-outs or recesses 30 can be formed in these sides. As shown in FIG. 1, and in more detail in FIGS. 3, 4 and 5, in one form these recesses 30 can comprise both a generally vertical 32 and a generally horizontal 34 panel section. The generally horizontal panel 34 can be formed with a plurality of small holes 36 to permit access of ambient air into the interior of an arrangement of stacked cell bodies 12A and spacer sections 14A, which in use are otherwise generally airtight due to the snug fit and interlocking of the respective cell bodies and spacer sections (as is also the case in some embodiments where the cell bodies and spacer sections are extruded so as to be integrally formed as one item). Also, the generally vertical panel 32 of the recess 30 can also be arranged to include a number of slots 38 for facilitating aeration of the stacked cell bodies and spacer sections.

The cell bodies and spacer sections are typically interlocked by using a system of interfitting projections and recesses to provide the stack with some stability. In the particular form shown in FIGS. 2 and 5, the uppermost face 39 of the spacer section 14A has a plurality of circular recesses (or holes 40) for receiving a corresponding pin which can be formed as a lug on part of the adjacent cell body, or even as a discrete item for locating in corresponding recesses in both the spacer section and the cell body with some form of frictional interfitting. In other embodiments, there may be integral projections which extend from the spacer section into corresponding recesses arranged in the cell body. In still other embodiments, the interlocking feature may be any form of tab, slot or other projection that is either discrete or integrally formed with any component, to enable a secure seating of a plurality of spacer sections and cell bodies so as to form a vertical stack of the type shown in FIG. 8, and which will shortly be described in more detail.

In other embodiments, the particular shape of the cell bodies and spacer sections need not be four-sided (such as rectangular or square), but can be circular or polygonal or some other convenient shape and form for manufacture.

Figure 8:
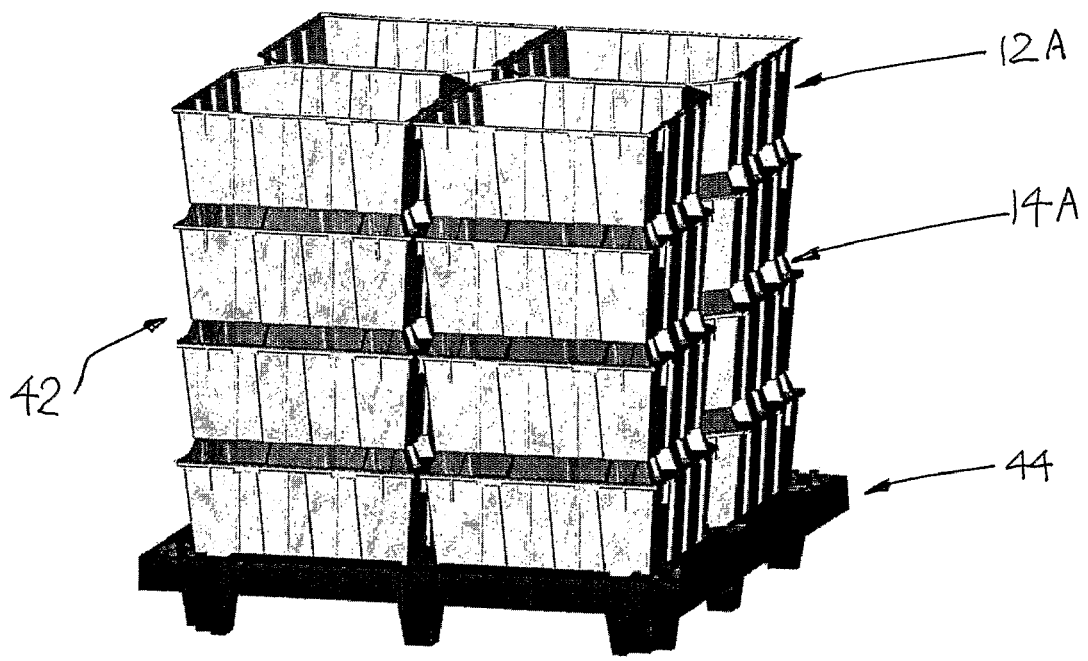
FIG. 8 is a perspective view of four stacks, each stack having four of the modules of FIG. 2, the four stacks seated on a support pallet.

Referring now to FIG. 8, a water treatment apparatus is shown which comprises sixteen respective cell bodies 12A with intervening spacer sections 14A that are arranged in four separate stacks 42, each stack 42 having four cell body 12A and three spacer section 14A components. Water that is destined for treatment is divided so as to pass in parallel through each one of the stacks 42 of four cells 10A. Should there be an increase in the amount of water to be treated, any number of additional stacks 42 of four cells can be added to the treatment apparatus, and of course if the amount of water to be treated is reduced, one or more of the stacks 42 can be taken 'off-line' for a period.

Figure 9:
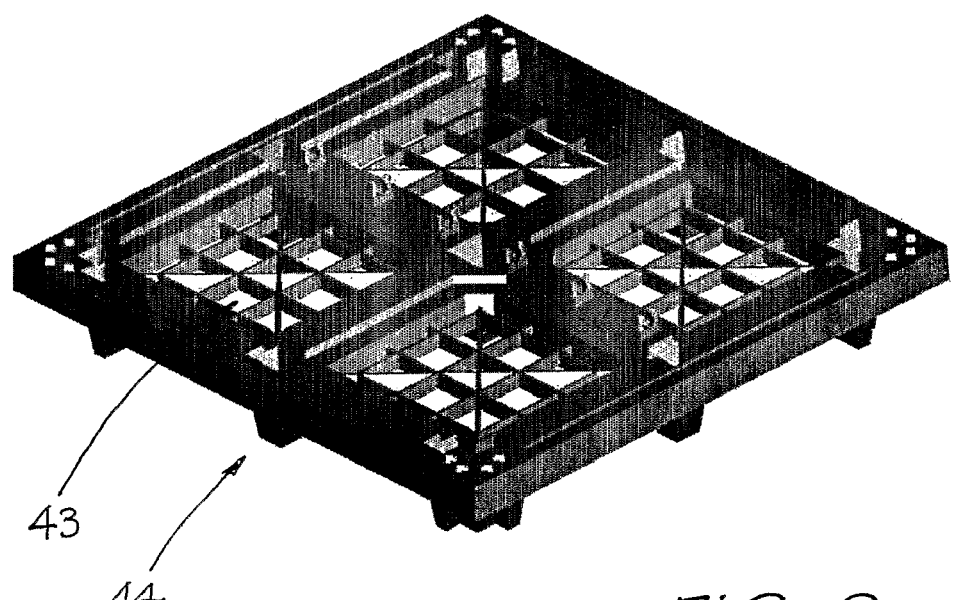
FIG. 9 is a perspective view of the support pallet of FIG. 8 without the four stacks located thereon.

In the embodiment shown in FIG. 8, the four stacks are arranged to be seated on a gridded support pallet, which is shown in more detail in FIG. 9. In use the gridded pallet is located atop and arranged to be mated with the uppermost rim of a storage reservoir 46, as can be seen in the configuration shown in FIG. 10. The treated water falls by gravity into the reservoir 46 after percolation through the various treatment stages in the four cell stacks 42, and after passing through the holes 43 in the gridded support pallet 44. In the embodiment shown in FIGS. 8 and 10, the four stacks 42 are arranged to be seated in two rows of two on the support pallet 44.

Figure 11:
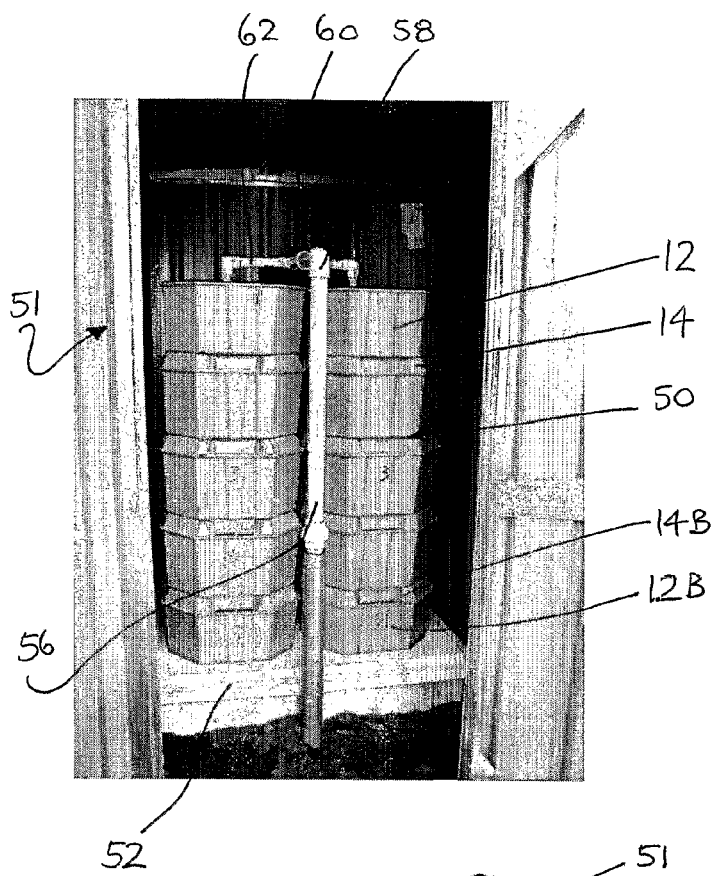
FIG. 11 is a perspective view of two stacks, each stack having four of the modules of FIG. 2, the two stacks seated on a support platform and located in a storage shed.

In the embodiment shown in FIG. 11, there are two stacks 50 of four cell bodies 12 and three spacer sections 14. Each of these stacks are seated atop a respective fifth cell body 12B and spacer section 14B, and the fifth cell bodies 12B are located on a platform 52 which is seated on surrounding ground within a storage shed 51. In this embodiment, the treated water is collected in each of the fifth cell bodies 12D, which act as a catchment sump to store the water for further re-use.

Each stack enables a single-pass treatment of domestic wastewater source by trickling the water through four separate stages of treatment. Each of the consecutive treatment stages is arranged in a separate cell body and operates with a different treatment environment of natural micro-biological living matter to sequentially provide effective consumption and thereby treatment of the organic material from the water.

Figure 12:
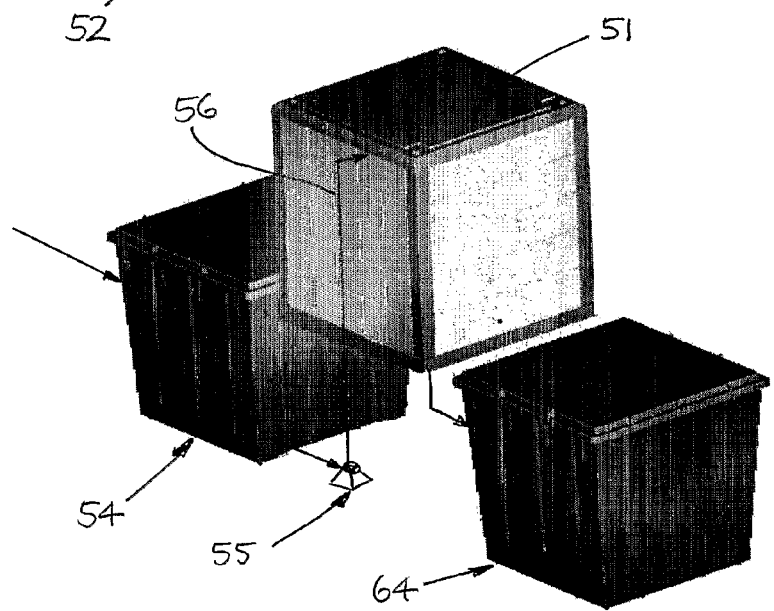
FIG. 12 is a perspective view of a water treatment system comprising a reservoir for receiving water, a treatment apparatus of the type shown in FIG. 11, and a collection reservoir for receiving water that has been treated in accordance with the method of the invention.

Referring to FIG. 12, in operation a grey water reservoir in the form of a buffer sump 54 is used to collect the incoming grey water from a domestic house, for example. The sump 54 is arranged to be large enough to accommodate the peak flow rates that commonly occur in the morning and evening at a domestic residence. A pump 55 is fitted in this sump 54 and the pump 55 is controlled by an electronic control system that doses the raw grey water influent onto the each of the stacks of water treatment cells continuously over a 24 hour period. In this way the organic communities that are present in the media in the cells of the filter are never stressed by excessive hydraulic loads that would occur if the grey water influent was to run directly into the stacks of water treatment cells. By equalising the dosage rate of wastewater, the operational risk of the organic material in the vermicomposting beds becoming anaerobic is reduced.

In other embodiments, the electronic control system can regulate the water flow to deliver a predetermined quantity of water to the stack over a specified time, in other words to deliver a constant mass flux per unit area to the stack (liters per second per meter squared). The delivery can also be intermittent, which has been shown in some experiments to provide a 'rest period' for the worms and other creatures to more effectively digest the food material that is present in the filter bed prior to any influx of new matter. It is also believed that a 'pulsing' system of this type may draw in additional air when the water flow commences into the stack.

In the embodiment shown in FIG. 11, a grey water stream can flow in use via a metering pump upward from a buffer sump through a vertical pipe 56 which delivers the flow of grey water to a location at the top of each stack 50 of water treatment cells. The vertical pipe 56 is connected to a ninety degree pipe bend 58 located higher than the level of top of each stack 50 and the ninety degree bend is then connected to a smaller pipe fitted with a T-junction 60. From either arm of a T-junction 60 a smaller pipeline 62 is arranged to extend to a region over the top of the uppermost cell in each stack 50. In use, grey water passes via the vertical pipe 56, ninety degree bend 58, T junction 60 and two small pipes 62 and is delivered into the uppermost cell of the stack 50, and water treatment then ensues.

In the embodiment shown in FIG. 11, after water treatment, the water travels into the fifth storage cell 12B in each stack, for later re-use. A system of pipes and connectors can be arranged to remove the treated water for other domestic uses, such as watering gardens, hosing pathways, flushing toilets etc. In the embodiment shown in FIG. 12, the water flows under gravity from the treatment stack(s) and into the storage reservoir 64, which can be located underground, for example in a backyard. Water is then drawn from this storage reservoir 64 for re-use.

Figure 13:
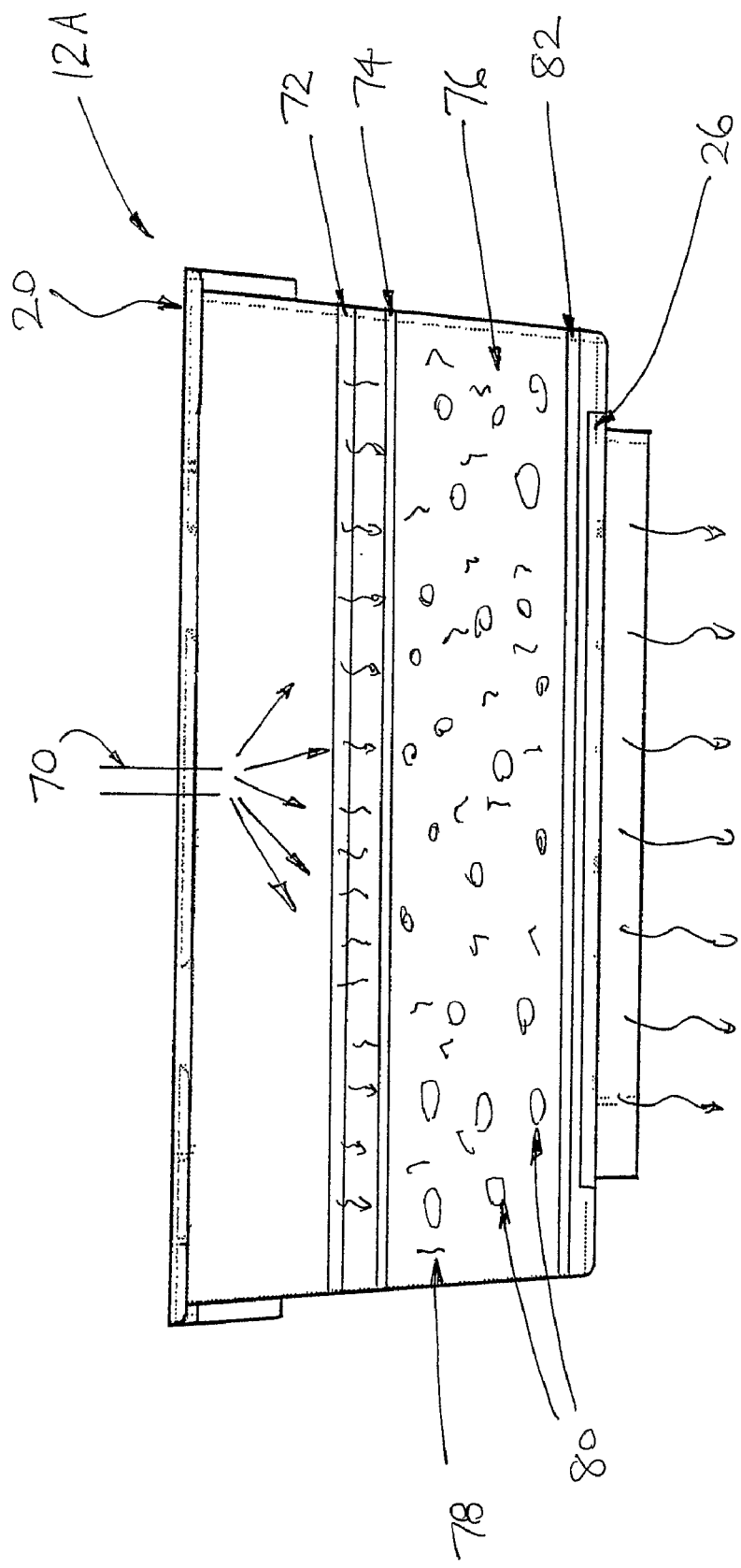
FIG. 13 is a schematic side elevation view of a chamber of the module of FIG. 2 when configured for screening and pre-digestion of organic matter in accordance with the invention.

Referring now to FIG. 13, a schematic view is shown of one embodiment of the interior structure located in the uppermost cell body 12A of a stack of water treatment modules. This first treatment stage is known as the primary filter and pre-digestion stage. The grey water influent from the inlet pipe 70 is dispersed onto a broad mesh screen 72 which is positioned a short distance below the uppermost rim 20 of the cell body 12A. The screen 72 catches any large solid material (e.g. food scraps, macerated organics, hair etc produced from baths, sinks, showers and washing machines), and this caught material then slowly breaks down, over time and under the action of water flow, into smaller particulates. The mesh screen 72 also acts to disperse influent grey water into droplets and therefore to protect the integrity of the lowermost layer of organic material in the cell from erosion by the jetting of water. Underneath the broad mesh filter screen 72 is a layer of a finer commercially available filter fabric 74, typically in the form of a flat sheet of nylon mesh, which further acts to protect the subsequent layer of organic material 76 from erosion by influent water by dispersion. Depending on the nature of the material being treated, only one of the mesh screen 72 or the filter fabric 74 may be necessary for this purpose.

After passing through the screen and filter layers, the inlet grey water then percolates under gravity into an organic material bed 76 which can comprise a mixture of particulate or granular peat, vermiculite and other materials such as zeolite. In some embodiments, the organic media can comprise rice husks, compost base or other organic materials, for example silica, diatomaceous earth, activated carbon or charcoal, clays etc. The layer of the filter fabric 74 is positioned adjacent to the upper surface of the organic material bed 76.

The water treatment in the organic material bed comprises a combination of peat filtration and vermicompost techniques for the treatment of the wastewater and the associated organic solids. The layer of peat (preferable coconut peat/coir) can be innoculated by vermicompost worms 78 and other associated organisms to provide a good environment for worm breeding. The bed is deep enough to have sufficient hydraulic holding capacity to enable the peat bed to filter the effluent, while at the same time to provide a habitat for the vermicompost organisms to feed on the available food and organisms that are in the wastewater influent. The bed is also arranged to be shallow enough to ensure that compaction of the coco-peat and mature vermicompost bed does not occur due to the weight of this saturated medium. An example bed depth of organic material is around 100 millimetres, but this obviously depends on factors such as peat/vermiculite size distribution and bulk density, porosity of the formed bed, etc.

Vermicomposting is the farming of earthworms (compost worms) to accelerate the natural breakdown of organic matter and using micro-organisms to digest food sources in a rapid feeding process. The biological science of vermicomposting or vermiculture has been widely studied. The particulate organic matter in the feed water is reduced to microscopic particles and these are in turn consumed by bacteria, fungi, protozoa and nematodes. Worms selectively ingest organic materials, decreasing the size of the ingested matter, and mix it with intestinal mucus and enzymes. Consequently, vermicast returns unique and desired organic biology and nutrients naturally back to the water, which when used in irrigation on the garden can return nutrients to the soil.

In the present apparatus, the depth of the each bed is variable to permit the maximum available oxygen levels sufficient to ensure a healthy functioning of largely aerobic breakdown organisms within the coco-peat and vermicompost bed. There is also a voidal area or open space contained by the spacer sections located above and below each coco-peat/vermicompost layer that enables movement of air to the surface of the bed, and thus facilitates the healthy functioning of aerobic organisms within the organic layer. Sufficient air movement around each bed is facilitated by the holes 36 or slots 38 located in the spacer sections 14A that enable air movement into the cell bodies in the stack(s).

As shown in FIG. 13, there are a plurality of spaced apart wads, tufts or pillows 80 of an inorganic fabric (such as nylon) that are randomly dispersed throughout the peat, vermiculite etc that makes up the organic material bed. These discrete pillows 80 of fabric serve a number of functions within the organic bed. During periods when an influx of a material enters the stack which the worms and other organic creatures (for example insects such as larvae and mites) are unused to, the presence of the pillows 80 creates an alternative host environment into which these creatures and other aerobic organisms can migrate for a period of time until the situation stabilises. Such a diversity in what is known as an 'ecotone', or habitat, can encourage the development of these organisms and help them cope with any environmental fluctuations which may occur, for instance if a larger than usual amount of ammonia develops in the organic material, or if an unusual or toxic component is suddenly present in the wastewater feed.

It is possible for an aerobic bed of organic material to turn into an anaerobic environment if a high amount of certain types of feed contaminant enter the stack. Such a change can be fatal for aerobic creatures and organisms that are present therein, for example if a large amount of fatty material enters the bed. The presence of the inorganic pillows 80 facilitates a bed with an open, porous structure, which can assist drainage and avoid ponding, or oversaturation, of water therein. The stagnation of water containing fatty materials can rapidly 'seal' an organic bed and create a thick, gelatinous bioslime which exludes air and turns the bed anaerobic. In solely organic beds, a bioslime can bridge the entire bed and impede the flow of any water therethrough. By using inorganic, discrete pillows to assist the drainage of an organic bed, the flow of feed wastewater which contains dissolved oxygen helps to maintain the bed in a healthy aerobic state. In this way, the aerobic organisms to continue to thrive and to consume organic matter from the waste water flow.

Various materials can be mixed within the peat bed layer in order to facilitate better drainage though the bed, when it is deemed desirable. Vermiculite can be used for its cation exchange properties as well as the provision of a different type of habitat that will bring a greater diversity of organisms to the filter. The use of a phosphate adsorbing media can be added when phosphate removal is a stated objective of the treatment, for example if the treated effluent is to drain to a water course. Zeolites or bentonites can be introduced for their cation exchange and removal properties, depending on the source and composition of the water being treated.

The contents of the organic peat bed are supported by a broad mesh screen 26 which is around 90% open space and is positioned in use in the square (or rectangular) opening 24 defined by the lateral lip 22 on the underside of the cell body 12A, as shown more clearly in FIGS. 2 and 6. The mesh screen 26 also acts to disperse grey water into droplets and therefore to protect the integrity of the layer of organic material which is located in the next lowest cell in the stack. Typically the mesh screen is made of a neutral or inert material such as hard plastic. Between the broad mesh filter screen and the organic peat bed is located a layer of a finer filter fabric 82, typically in the form of a flat sheet of nylon mesh, which further supports the organic peat bed in the cell. Depending on the nature of the material being treated, the filter fabric layer may not be required.

Apart from reducing the incidence of bed erosion, the use of a filter fabric such as nylon (in one or more layers) located above and below the peat bed also has the advantage that the filter layer can provide an open structure that enables migration of sensitive organisms during times that the filter might be subjected to high hydraulic loading peaks or when a feed contaminant enters the bed and a migration by some species into a different ecotone is required. The creation of diverse habitats can increase in robustness of the ecosystem within the bed. The filter fabric layer(s) can also help with thermal regulation of the bed to stabilise the breeding of worms and other organisms which feed on the contaminants in the water. Finally, the filter fabric layer(s) can slow the rate of water movement and thereby increase retention time of water in the bed to improve filtration efficiency and capture of fine material.

The design of the stacks allows a large flow of air to move across the top of each bed to take off any ammonia, $CO_2$ or any other gases that might be produced during the treatment of the effluent. Fresh air is brought in and refreshes the stale air around the surface of each bed. The organisms that occur in each bed require oxygen to respire and thus the availability of oxygen rich air will enable better functioning of the biota in each layer.

The uppermost cell body of a treatment stack (such as that shown in FIG. 8) is arranged for ease of removal during maintenance intervals, and replaced with new media, should the peat become too badly broken down or compacted. The "harvested" first layer of the bed can be used for worm production and to create the inoculation that is needed for seeding new filter beds with worm-friendly bacteria and other organisms.

The grey water is now at a primary treated effluent stage. This grey water effluent then percolates through each of three further layers within the filter stack 42. Each layer is contained within its own cell 12A.

Figure 14:
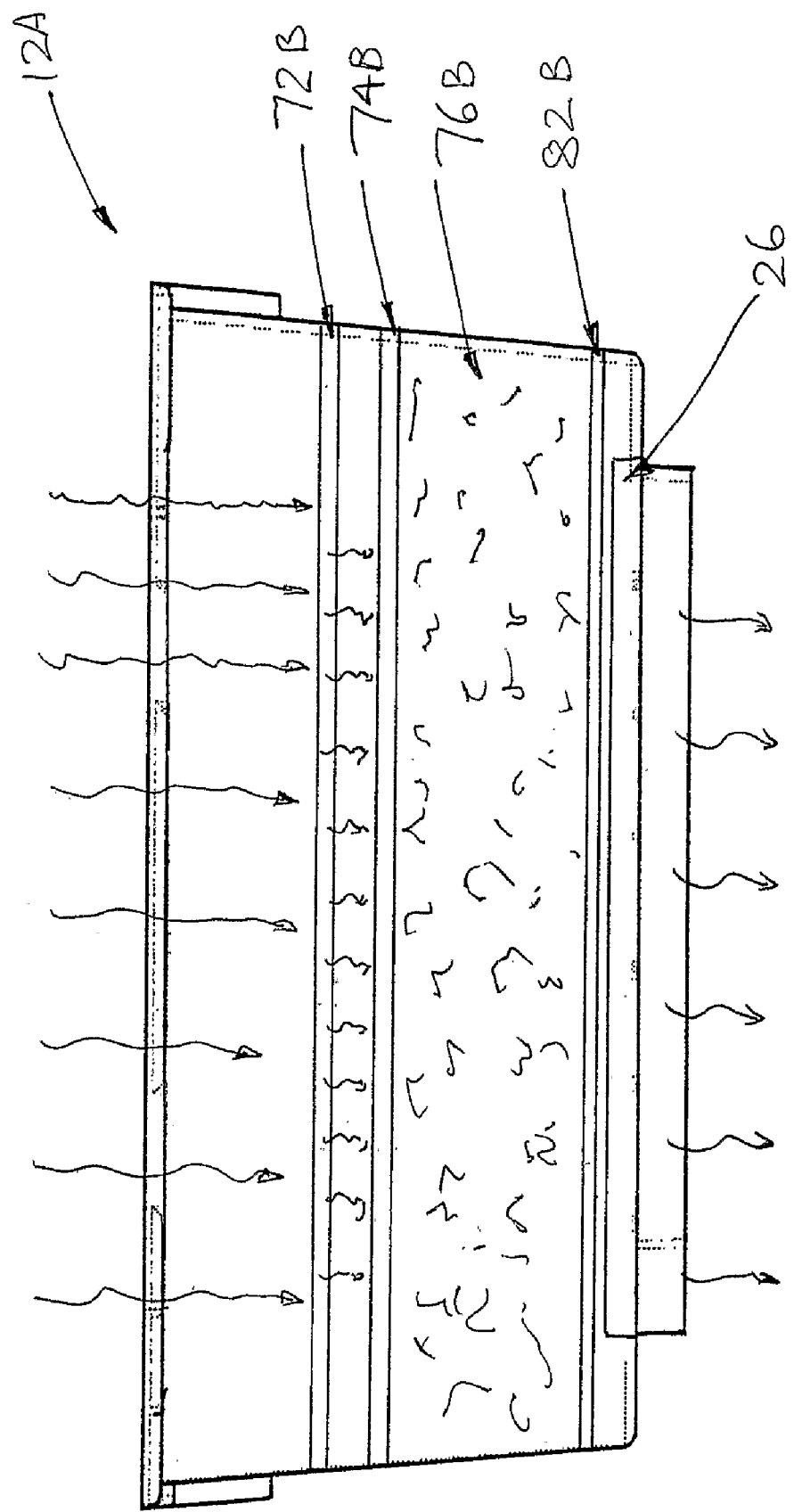
FIG. 14 is a schematic side elevation view of a chamber of the module of FIG. 2 when configured for primary vermicomposting of organic matter in accordance with the invention.

Referring now to FIG. 14, a schematic view is shown of one embodiment of the interior structure located in the second cell body of a treatment stack 42. This second treatment stage is known as the primary vermicomposting stage. The grey water influent from the primary filter and pre-digestion stage is trickled through the spacer section 14A located between the first and second cell bodies during which time it can become aerated. The influent water is dispersed onto a broad mesh screen 72B which is positioned a short distance below the uppermost rim 20 of the second cell body 12A. The mesh screen acts to disperse influent grey water into droplets and therefore to protect the integrity of the lowermost layer of organic material in the cell from erosion by the jetting of water. Underneath the broad mesh screen is a layer of a finer filter fabric 74B, typically in the form of a flat sheet of nylon mesh, which further acts to protect the subsequent layer of organic material from erosion by influent water, as well as having other similar functions to those already described for the earlier primary filter and pre-digestion stage. Depending on the nature of the material being treated, only one of the mesh screen 72B or the filter fabric 74B may be necessary for this purpose.

After passing through the mesh screen 72B and filter fabric 74B layers, the inlet grey water then percolates under gravity into an organic material bed 76B which can comprise a mixture of peat, vermiculite and other materials such as zeolite. In this stage the peat is packed more densely than in the previous treatment bed, but is generally arranged to be of a thinner bed depth. The bed is therefore arranged to percolate more slowly in order to allow a high degree of vermicomposting activities to occur, whilst being shallow enough to be sufficiently aerated from the upper and lower surfaces of the bed. Such an arrangement can support a higher load of worms and other living organisms.

As shown in FIG. 13, the contents of the organic peat bed in the second treatment cell are supported by a broad mesh screen 26 and a layer of a finer filter fabric 82B, typically in the form of a flat sheet of nylon mesh, for the same purpose as has previously been described in relation to the first treatment cell.

The grey water is now at a stage where vermicomposting activity is well underway. The grey water effluent then percolates through a further two layers within the filter stack. Each layer is contained within its own cell. The third cell layer is a secondary vermicomposting digestion stage and the fourth (and last) cell layer is a tertiary treatment (or 'polishing') stage.

Figure 15:
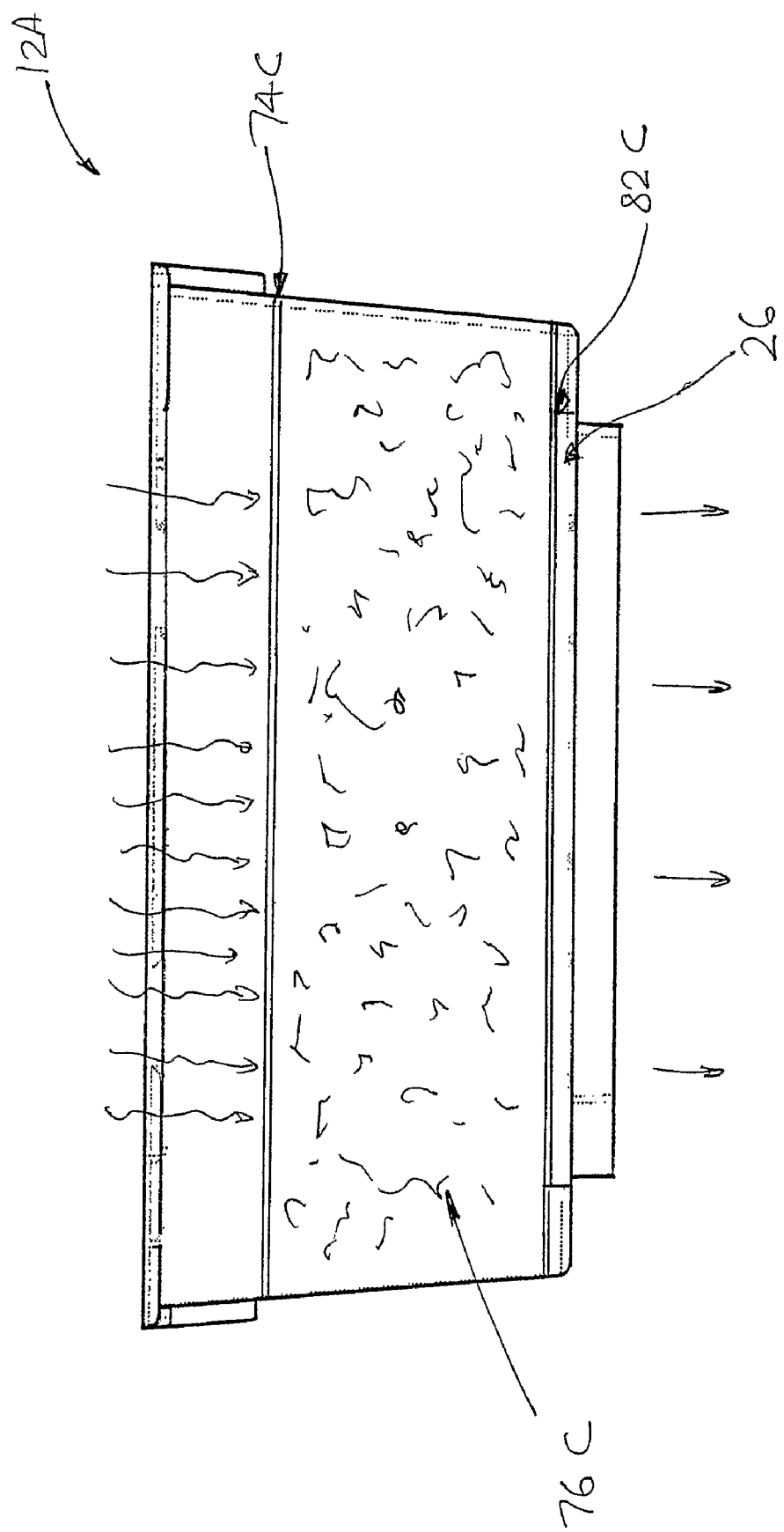
FIG. 15 is a schematic side elevation view of a chamber of the module of FIG. 2 when configured for secondary or tertiary vermicomposting of organic matter in accordance with the invention.

Referring now to FIG. 15, a schematic view is shown of one embodiment of the interior structure located in the third and fourth cell bodies of a treatment stack. As the structure of the bed and cell contents in each of these stages is the same, for brevity only one description is given herein.

The grey water influent from the primary vermicomposting stage is trickled through the spacer section located between the second and third cell bodies during which time it can become aerated. The influent water is dispersed onto a layer of a filter fabric 74C which acts to disperse influent grey water into to protect the integrity of the organic material in the third cell from erosion by influent water, as well as having other similar functions to those already described for the earlier primary filter and pre-digestion stage.

After passing through the filter fabric 74C, the inlet grey water then percolates under gravity into an organic material bed 76C which can comprise a mixture of peat, vermiculite and other materials such as zeolite. In this stage the peat bed depth is arranged to be much deeper and also more densely packed than in the previous two stages, to support a high degree of worm activity (for example, a bed depth of 170 mm). As a large proportion of the organic matter from the feed grey water has already been consumed by this stage, there is not so much oxygen demand by the worms and organisms present in the third and fourth stages. Therefore the third and fourth stages are arranged to have a much longer residence time in order to be able to hold and treat the vast majority of the remaining organic matter, with even more complex digestion processes going on in the fourth stage.

As shown in FIG. 15, the contents of the organic peat bed in the third and fourth treatment cells are supported by a layer of a fine filter fabric 82C, typically in the form of a flat sheet of nylon mesh, for the same purpose as has previously been described in relation to the first and second treatment cells.

The multi-layered approach of consecutive peat/vermicompost beds used within the filter system has the advantage that each bed layer is separated and so cannot compress the coco-peat/vermicompost bed immediately below it. Each bed in each cell has its own internal packing and design and these differ across both the primary screening a pre-digestion stage and the primary, secondary and tertiary vermicomposting filters, as each stage fulfils a specific role in the treatment of the grey water.

Figure 10:
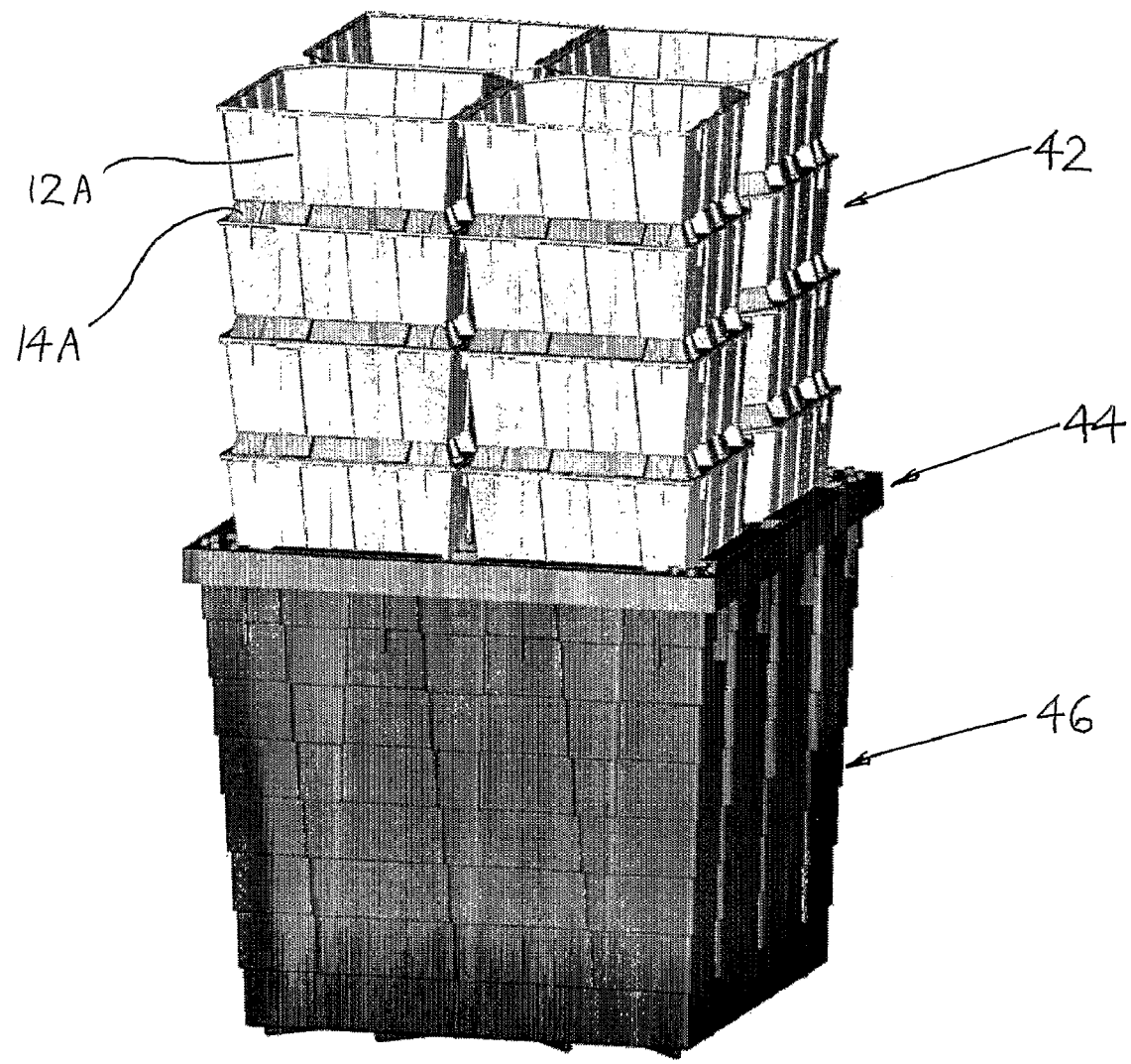
FIG. 10 is a perspective view of the four stacks and the pallet of FIG. 8 when positioned atop a single storage reservoir.

The treated effluent then flows down into a sump, being either the fifth cell 12B in the stack (as shown in FIG. 11) or a large reservoir or sump 46 (as shown in FIG. 10) that lies beneath the secondary and tertiary filtration and vermicomposting. This treated and renewed grey water can then be delivered to re-use areas by a pump which is arranged to access these reservoirs or sumps, depending on the locational requirements. A schematic view of this apparatus is shown in FIG. 12 in a location adjacent to a domestic house.

The treated effluent can either be stored within the bottom storage section of the filter, awaiting distribution to a planted landscape, transported by pumping to tertiary treatment system (for example, chlorination or by being gravity-fed through a UV treatment cell for disinfection), or immediately re-used in the domestic dwelling for flushing water within toilet systems.

Treated effluent from either stage can be transported by small bore pipe (by gravity or by pump) to an off-site centralised secondary (or tertiary) treatment systems.

The system described hereinabove enables the treatment and re-use of grey water from a domestic effluent separately from black water. To take the faecal load (together with toilet flush-water with makes up about 30% of the total wastewater flows from a domestic residence) and mix it with the rest of the wastewater flows is disadvantageous because the blackwater contains the majority of pathogens and infectious organisms. It is these organisms that are difficult to eliminate during the treatment process. By prevention of the mixing of these organisms into the majority of the wastewater flows, and treating a grey water feed (such as laundry, shower, dishwasher and sink effluents only), the treatment process can be operated at a higher rate and efficiency than if a mixed effluent of black and grey water effluent was to be treated.

The apparatus shown in the drawings can offer primary treatment of greywater effluent (with or without macerated organic kitchen waste solids), for recycling of nutrients into the wastewater stream, and its subsequent re-use as a nutrient rich irrigation water within planted landscapes, or as preparation for secondary treatment, by an auxiliary treatment system.

The apparatus can also be used for secondary and tertiary treatment of primary treated greywater effluent, or for provision of a high quality irrigation water for re-use within planted landscapes, or for re-use within the house for toilet flushing water, or as preparation for further tertiary treatment, by an auxiliary treatment system.

In some embodiments the apparatus can function as a system for secondary and tertiary treatment of blackwater effluent that has already been subjected to an earlier, separate primary treatment. The resulting water can be used for the provision of a high quality irrigation water for re-use within planted landscapes, for example.

Once the wastewater stream has been treated, either at a primary level, or to a secondary or tertiary level, it can be transported within a small-bore piping system (either pressurised or gravitated) to areas where it can be treated to a further level, or collected from a number of distributed filters and transported for re-use to suitable locations.

In some embodiments it is envisages that the stacks of treatment beds described herein can be connected to two vents, one being an exit air vent and the other being an inflow vent. In this way the objective of removing oxygen deficient air out of the system and replacing it with oxygen rich air can be achieved, as well as possibly heating the beds. This is because both high temperatures and low temperatures will reduce the metabolism of the organisms in the vermicomposting system. Organisms within the bed will start functioning sub-optimally at both extremes.

In extreme conditions in some climates it might be necessary to lift the temperature of the bed if it drops to levels that will reduce the effective functioning of the organisms within the bed. This can be done in a variety of ways such as passing heated air through the spacer elements in the stacks, or circulating heated liquid through pipes that are arranged within the vermicomposting beds, by use of a jacket that surrounds the stacks themselves, or by embedding a heater element with the inner tank walls.

Figure 17:
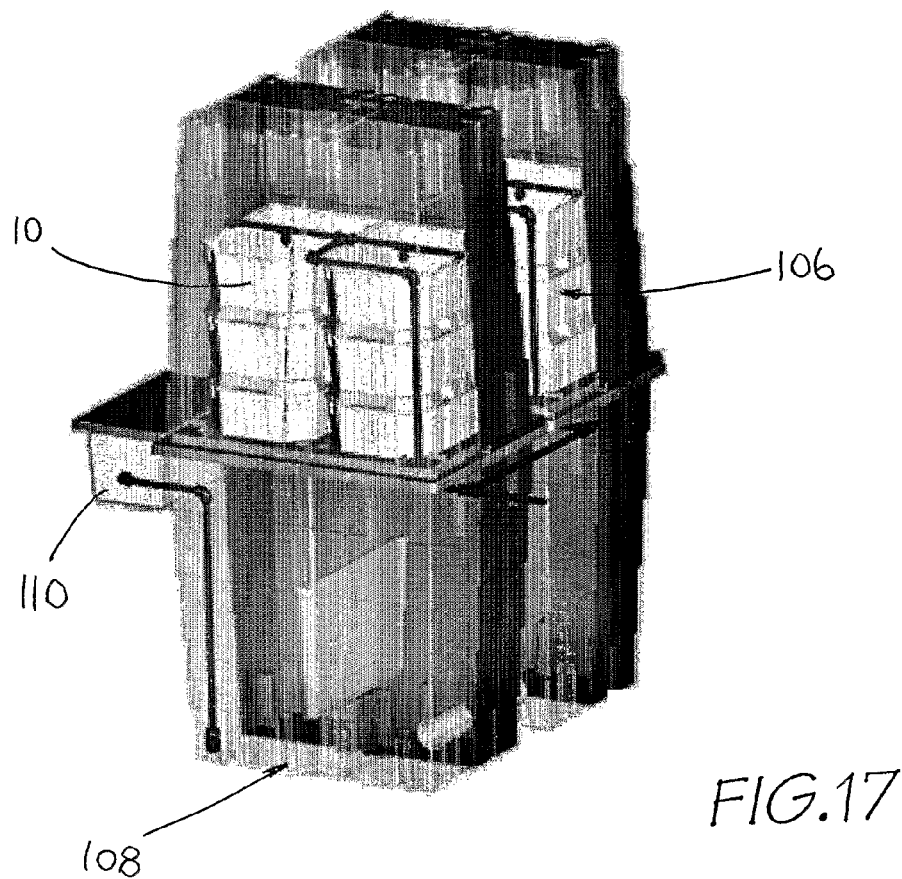
FIG. 17 is a perspective view of four stacks, each stack having three of the modules of FIG. 1, the four stacks seated on a support and located above a collection reservoir for receiving water that has been treated in accordance with the method of the invention.
Figure 18:
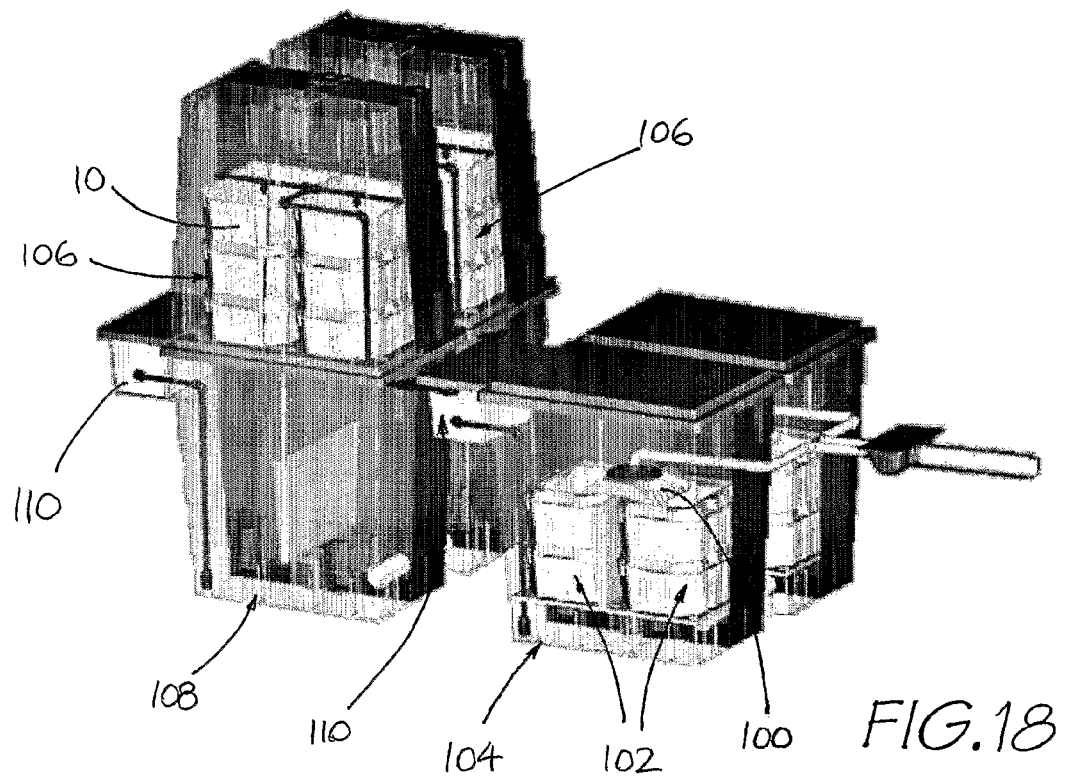
FIG. 18 is a perspective view of the combination of the apparatus of FIG. 16 and FIG. 17 when connected by a piping arrangement.
Figure 19:
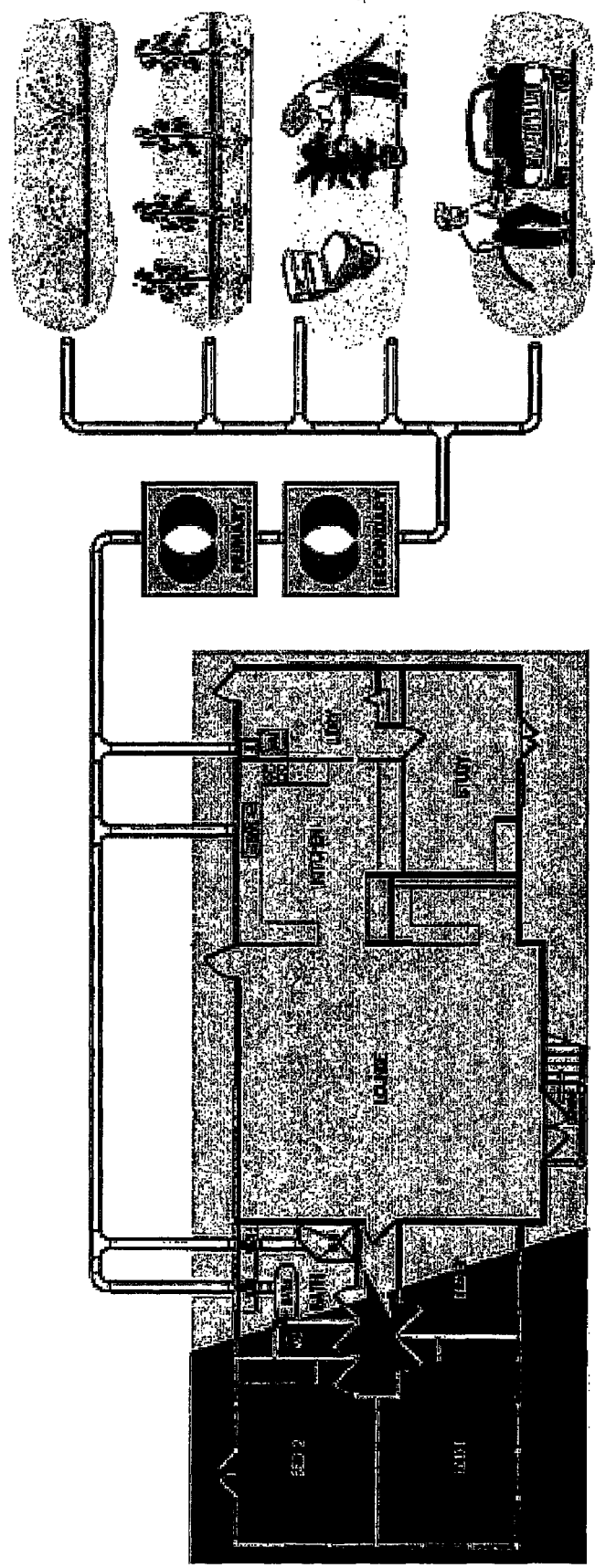
FIG. 19 is a schematic diagram of a two-stage grey water treatment apparatus of the type shown in FIGS. 16 to 18 when connected to various sources of grey water feed from a domestic home.

Referring now to FIGS. 16 to 19, a further embodiment of a grey water treatment system comprising a primary filtration and vermicomposting treatment stage, followed by a secondary filtration and vermicomposting stage is shown. Treated grey water is collected and reticulated to various domestic and community uses, as shown in FIG. 19. FIG. 19 is a schematic diagram of the two-stage apparatus connected by pipes to various sources of such grey water feed from a domestic home.

Figure 16:
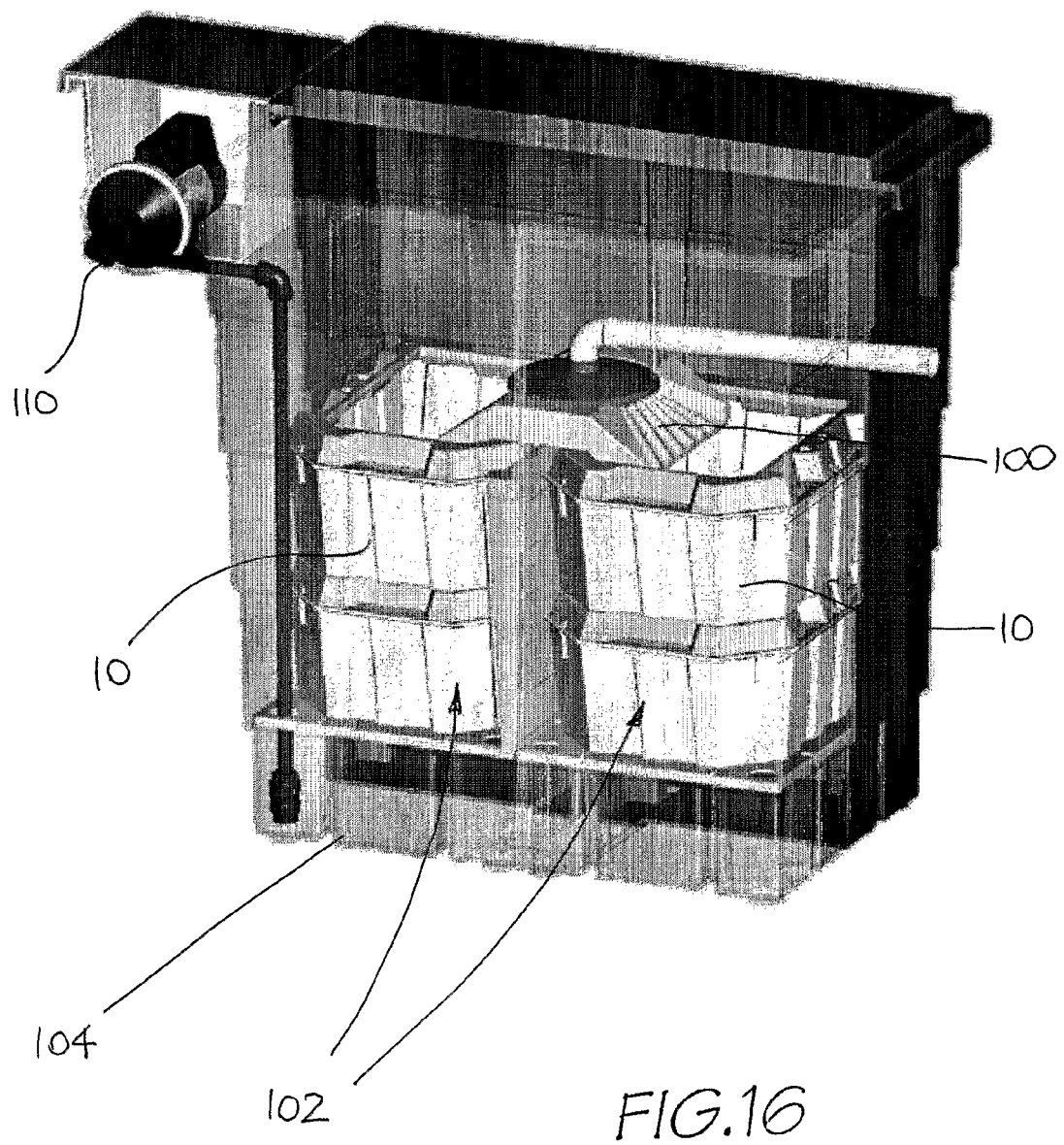
FIG. 16 is a perspective view of two stacks, each stack having two of the modules of FIG. 1, the two stacks seated on a support and located above a reservoir.

Referring now to one specific embodiment in FIG. 16, a grey water stream floods into a splitter box where it is divided into two streams by passing over a distribution fan 100 and into each stack 102 of treatment cells 10.

In this case the grey water influent percolates through two layers of primary screening and digestion (each layer contained within its own cell 10) and collects in the sump 102 located underneath these stacks.

In all other respects the interior configuration of these treatment cells 10 is the same as already described for the embodiment shown in FIG. 13.

Referring now to FIG. 17, the grey water effluent is pumped from the sump 102 through into a primary and secondary vermicomposting process, in this embodiment located in three layers of cells 10 arranged in four separate stacks 106.

In all other respects the interior configuration of the treatment cells in these stacks 106 is the same as already described for the embodiment shown in FIGS. 14 and 15.

The treated effluent then flows down into a large sump 108 that lies beneath the secondary filter. This treated and renewed grey water is then delivered to re-use areas by a pump 110 that is located in a sealed pump box that is positioned alongside the secondary filter at ground level.

The assembled configuration of the primary screening and digestion stacks (of FIG. 16) and the primary and secondary vermicomposting stacks (of FIG. 17) is illustrated in FIG. 18.

By separating the grey and black water with minor alteration in the domestic plumbing the inventor believes that a saving of 75% of the drinking water usage in each house can be made by recycling and treating the grey portion safely. This low cost solution can save this valued resource (drinking water) and creates a "reuse water" to be applied to non-potable applications. It is envisaged that such re-use water can be reticulated within a developed environment without the fear of contamination by high levels of infectious organisms.

It is also envisaged that the apparatus and system could be retrofitted to existing on-site waste water treatment systems in non sewered areas. For example, septic tank systems often fail to adequately treat and dispose of a large quantities of wastewater. If the greatest proportion of the household waste water (grey water) was to be diverted to a grey water treatment system, it would enable the existing septic tank systems to function most effectively as black water treatment systems.

Recovering water from waste water flows in environmentally sensitive areas where discharge of treated wastewater is a problem is another advantage envisaged with this apparatus and system. In areas where plot sizes are small and where re-use areas are within the housing complexes (for example, sports fields, planted lanes and walkways), the option of separate grey water and black water treatment has distinct advantages. The grey water can be pre-treated on site as described and taken in a small bore pipe system to a secondary treatment filter where it can then be distributed to any area within the development where re-use is desirable, without the risk associated with re-use of effluent that has black water origins. With the possible addition of a UV or ozone purification unit, it is envisaged that the recycled water could even be rendered safe for domestic use.

Specific Example

Figure 20:
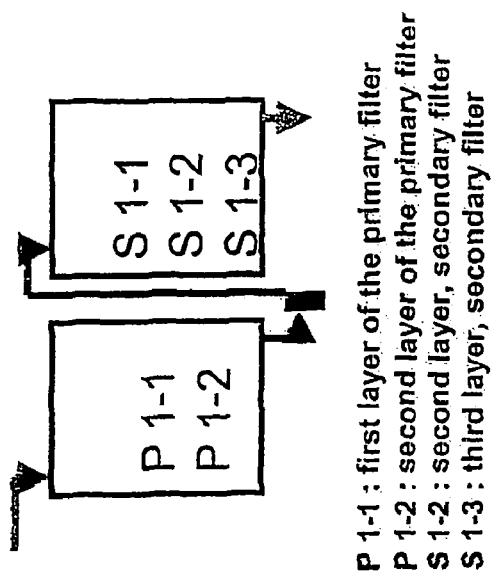
FIG. 20 is a table showing example data produced using the apparatus of FIG. 18.

One set of example data is given in FIG. 20, produced using the assembled apparatus of FIG. 18. For a two-stage primary treatment (primary screening and digestion) (P1) followed by a three-stage secondary treatment apparatus (primary and secondary vermicomposting process) (S1), data is presented to show the dramatic reduction in concentration of various organic species present due to the filtration and composting processing.

Although the invention has been described with reference to particular embodiments and examples, it will be appreciated by those skilled in the art that the invention may be embodied in many other forms.

The invention claimed is:

1. A modular water treatment apparatus comprising:
a plurality of chambers each respectively arranged in use for housing a treatment bed that is arranged to host a vermicomposting treatment process; and
a plurality of spacer elements located between respective adjacent chambers in use for providing an air gap between the treatment beds;
wherein the chambers and spacer elements are stackable to provide a multiple stage treatment apparatus in which water to be treated percolates through the respective treatment beds, and wherein the spacer elements comprise one or more ventilation openings for in use aeration of the filter material layers when the spacer elements and chambers are arranged in a stack; and wherein the or each spacer element has a central aperture, the aperture defined by a peripheral wall, the wall having the one or more ventilation openings therein.

2. An apparatus as claimed in claim 1 wherein the or each ventilation opening is a slot and/or a hole arranged with an axis aligned in the same direction as the central aperture.

3. An apparatus as claimed in claim 1 wherein the spacer element(s) and the chamber(s) are arranged to be interlocked in use by a system of interfitting projections and recesses.

4. An apparatus as claimed in claim 1, wherein each respective chamber has a said spacer element integrally formed therewith.

5. An apparatus as claimed in claim 1 wherein the base of the or each chamber is fitted with a removable mesh screen to support the treatment bed in the or each chamber in use.

6. A module for use in the modular water treatment apparatus as claimed in claim 1, the module comprising a chamber and a spacer element and arranged to be stackable with a like module as part of the multiple stage treatment apparatus.

7. A spacer element for use in the modular water treatment apparatus as claimed in claim 1, the or each spacer element having a central aperture, the aperture defined by a peripheral wall, the wall having the one or more ventilation openings therein.

8. A method of water treatment comprising the steps of:
arranging a treatment bed that hosts a vermicomposting treatment process within each of a plurality of stackable chambers, wherein arranging the treatment bed comprises:
positioning a mesh screen at a base region of the or each chamber on which the treatment bed is disposed;
selecting a particulate organic material and an inorganic material for use in the treatment bed and discretely spacing the inorganic material amongst the particulate organic material;
positioning a filter fabric made of an inorganic substance between the mesh screen and the particulate organic material;
arranging the stackable chambers and respective spacer elements into a stack to provide a multiple stage treatment apparatus, the spacer elements located between respective adjacent chambers to provide an air gap between the treatment beds; and
passing water which contains biodegradable solids into the stack and allowing the water to percolate through the various treatment beds in the stack.

9. A method as claimed in claim 8 wherein the inorganic material is a fibrous or porous fabric material.

10. A method as claimed in claim 9 wherein the fabric material is shaped as a wad, tuft or pillow.

11. A method as claimed in claim 8 wherein the inorganic material is nylon fibre.

12. A method as claimed in claim 8 wherein the organic material is one of the group comprising peat, coca-peat, vermiculite, zeolite, rice husks, compost base, silica, diatomaceous earth, activated carbon, charcoal, clays or a combination of any of these.

13. A method as claimed in claim 8 wherein the step of arranging the treatment bed also comprises positioning an uppermost mesh screen at a region of the or each chamber which is above the particulate organic material.

14. A method as claimed in claim 13 wherein the step of arranging the treatment bed also comprises positioning a filter fabric made of an inorganic substance between the uppermost mesh screen and the particulate organic material.

15. A method as claimed in claim 14 wherein the filter fabric is arranged to be in contact with the particulate organic material.

16. A method as claimed in claim 8 wherein the filter fabric is arranged to be in contact with the particulate organic material.

17. A method as claimed in claim 8 wherein the inorganic substance is nylon.

18. A method as claimed in claim 8 also including the step of delivering the water from a reservoir into the stack.

19. A method as claimed in claim 18 wherein the step of delivering the water involves regulating the delivery of a predetermined quantity of water to the stack over a specified time.

20. A method as claimed in claim 18 wherein the step of delivering the water to the stack is intermittent.

21. A method as claimed in claim 8 also including the step of collecting the water after the water has percolated through the various filter material layers in the stack.

22. A method as claimed in claim 21 wherein the step of collecting the water involves receipt of water into a collection reservoir by gravity.

23. A method as claimed in claim 21 including the further step of treating the water as it is collected by applying an ultraviolet light.

* * * * *